United States Patent [19]

Patzschke et al.

[11] 4,384,946
[45] May 24, 1983

[54] AQUEOUS ELECTRO-DIPPING VARNISH/COATING MATERIAL WHICH CAN BE DEPOSITED AT THE CATHODE, ITS APPLICATION AND PROCESSES FOR COATING ELECTRICAL CONDUCTORS

[75] Inventors: Hans-Peter Patzschke; Suresh Merchant, both of Wuppertal, Fed. Rep. of Germany

[73] Assignee: Herberts G.m.b.H., Wuppertal, Fed. Rep. of Germany

[21] Appl. No.: 331,839

[22] Filed: Dec. 17, 1981

[30] Foreign Application Priority Data

Dec. 23, 1980 [DE] Fed. Rep. of Germany ....... 3048664

[51] Int. Cl.³ .............................................. C25D 13/06
[52] U.S. Cl. ................................ 204/181 C; 523/414; 524/538
[58] Field of Search ....................... 524/514, 513, 538; 523/402, 414; 204/181 C

[56] References Cited

U.S. PATENT DOCUMENTS

| | | | |
|---|---|---|---|
| 3,450,711 | 6/1969 | Megna et al. | 528/96 |
| 3,925,180 | 12/1975 | Jerabek | 204/181 |
| 3,936,404 | 2/1976 | Ishizuka et al. | 524/513 |
| 4,201,644 | 5/1980 | Todoroki et al. | 204/181 C |
| 4,252,703 | 2/1981 | Patzschke et al. | 523/404 |
| 4,293,398 | 10/1981 | Prucnal | 204/181 C |

FOREIGN PATENT DOCUMENTS

50-1407410 9/1975 Japan.

*Primary Examiner*—Joseph L. Schofer
*Assistant Examiner*—Sarofim N.
*Attorney, Agent, or Firm*—Mandeville and Schweitzer

[57] ABSTRACT

Aqueous, electro-dipping varnish/coating material, which can be deposited at the cathode and which contains (A) as cationic synthetic resin binder, an amino group-containing carrier resin with an amine number of 50 to 200 and a hydroxyl number of 50 to 400, (B) as nonionic synthetic resin binder, a water-insoluble wire-coating resin from the group of polyesterimides, polyesteramidimides and polyhydantoins with a melting point higher than 60° C. in an amount of 50 to 2000 parts by weight per 100 parts by weight of component A, and (C) transesterification catalysts, which are essentially stable in water, in an amount of 0.1 to 5 parts by weight per 100 parts by weight of the sum of components A and B and processes for coating electrical conductors therewith.

13 Claims, No Drawings

AQUEOUS ELECTRO-DIPPING VARNISH/COATING MATERIAL WHICH CAN BE DEPOSITED AT THE CATHODE, ITS APPLICATION AND PROCESSES FOR COATING ELECTRICAL CONDUCTORS

BACKGROUND AND SUMMARY OF THE INVENTION

The present invention relates to an aqueous electro-dipping varnish/coating material, which can be deposited at the cathode and contains a cationic synthetic resin binder which can be made water-soluble by protonizing with acids, and a nonionic synthetic resin binder, and its use for coating electrical conductors which are operated as a cathode. The invention moreover relates to a process for coating electrical conductors using this coating material.

Electrical conductors, especially so-called winding wires, are coated primarily with baking varnishes, which contain organic solvents, binders and varnish additives, including catalysts for cross linking the binder. The electrical conductors are coated with these varnishes and then heated to temperatures above about 200° C. in order to bake the varnish with cross linking. The coating and baking is repeated several times, in order to achieve an adequate coating thickness. Particularly great industrial importance has been achieved in this field by the polyesterimide resins (see British Pat. Nos. 937,377, 1,082,181, 1,067,541, 1,067,542; German Auslegeschrift 1,520,061, 1,520,068, 1,494,452, 1,494,454, 1,494,457, 1,937,311, 1,937,312, 1,957,157, 1,645,345, etc.).

The coating films of the well-known polyesterimide resins, which are baked onto the electrical conductors, especially copper wire, have excellent thermal stability, good elasticity, good solvent resistance and good behavior towards thermal shock. Polyesteramidimides are also of importance (see the above-mentioned German Auslegeschrift No. 1,494,457). Polyhydantoins are also known as wire coating resins (German Auslegeschrift No. 1,814,497).

In order to avoid the use of solvents, such as cresol, which are injurious to health and which, as a rule, are used in the known baking varnishes, the attempt was made to deposit water-dilutable wire coating resins anodically. However, because of the high resistance of the deposited films, only thin coatings were obtained. In the German Auslegeschriften Nos. 2,111,584 and 2,111,640, the logical proposal is therefore made to eliminate this defect by the addition of low molecular acids or by a lesser degree of neutralization. At the same time, polyesterimides or polyamidimides are used as binders, which have a high number of free carboxyl groups distributed in the molecular chain of the resin. This chemical structure leads to an electrochemical dissolution at the surface of the metallic workpiece, that is, a copper wire assumes a gray to green discoloration.

In the German Auslegeschrift No. 2,106,762, a sufficient film thickness is obtained by depositing consecutively, by the electro-dipping process, first a resin dispersion at a low voltage and then a water-dilutable varnish with a high film resistance at a higher voltage. The difficulty with this process lies in the fact that, in order to prepare the resin dispersion, emulsifiers must be added which remain in the film, and that, on rinsing off the deposited resin dispersion, there is a more or less severe dissolution of the deposited layer. No polyesterimides, polyamidimides or polyhydantoins are used.

In the German Auslegeschriften Nos. 2,248,836 and 2,842,626, processes are described for the electrophoretic deposition of cationic resins together with an additional resin from an aqueous dispersion, which lead to higher film thicknesses and show no metal dissolution. In these processes, pulverulent, nonionic synthetic resins are codispersed in a cationic binder and jointly deposited at the cathode. On the basis of their chemical structure, the resins, described in the Auslegeschriften, have no properties which would be suitable for coating wire. The preparation of a codispersed micronized powder is exceptionally expensive.

DETAILED DESCRIPTION OF THE PRESENT INVENTION

It is an object of the present invention to provide an electrodipping varnish/coating material, which is suitable for coating electrical conductors, especially copper wires. Surprisingly, it was discovered that coating materials, defined in the following, accomplish this objective.

Accordingly, the object of the present invention is an aqueous electro-dipping varnish/coating material, which can be deposited at the cathode and contains a cationic synthetic resin binder, which can be made water soluble by protonizing with acids, and a nonionic synthetic resin binder, which is characterized by the fact that it contains (A) as cationic synthetic resin binder, an amino group-containing carrier resin with an amine number of 50 to 200 and a hydroxyl number of 50 to 400, (B) as nonionic synthetic resin binder, a water insoluble wire coating resin from the group of polyesterimides, polyesteramidimides and polyhydantoins with a melting point higher than 60° C. in an amount of 50 to 2000 parts by weight per 100 parts by weight of component A, and (C) transesterification catalysts, which are essentially stable in water, in an amount of 0.1 to 5 parts by weight per 100 parts by weight of the sum of components A and B.

The inventive coating material is a stable aqueous dispersion which, on being deposited by the application of a voltage in the electro-dipping process, causes extremely slight manifestations of electolysis and produces a film of sufficient thickness, practically no metal being dissolved at the interface. After baking, the coating has the properties which are expected of a wire coating.

The coating material can be prepared in an extremely simple manner. The water-insoluble wire coating resin and the neutralized cationic synthetic resin binder can easily be dispersed together in water. For this purpose, the water-insoluble wire coating resin is melted in the water-soluble carrier resin at elevated temperatures or dissolved in it, possibly with the addition of small amounts of organic solvents. Subsequently, the mixture is neutralized with acids and diluted gradually with water, the water-insoluble resin being precipitated in a finely divided form. In so doing, care must be taken that a precipitation shock is not initiated by portions of water which are too large. It has proven to be advantageous to stir in the acid first, possibly with the addition of an equal amount of water, and then to add the remaining water in increasing amounts, which correspond approximately to a geometric series. The stability is additionally affected by the solvent used; in general, such water-miscible solvents are used which, after dilution with water, neither dissolve nor swell component B.

The codispersing of water-insoluble wire-coating resin can also be accomplished by working this resin, as a fine powder, into the neutralized, water-diluted synthetic resin binder with the help of equipment usually employed in the manufacture of varnishes. The required fine pigment dispersion can also be achieved by wet milling in suitable milling equipment, the concentration of the product depending on its ability to flow. The preparation of the powder can be accomplished by suitably milling or by precipitating the water-insoluble wire coating resin from organic solvents with water; the particle size should be less that 20 μm, especially less than 10 μm and preferably less than 5 μm.

It is also possible to prepare the dispersion of the water-insoluble wire coating resin and the solution of the cationic synthetic resin binder separately and then to mix them together. In each case, small amounts of organic solvents may be added.

The cationic synthetic resin binder preferably has an amine number of 80 to 150 and a hydroxyl number of 100 to 300, preferably of 200 to 300. The upper limit for the amine number at 120 is especially preferred. The cationic binder advisably has an average molecular weight ($\overline{M}_n$) of 500 to 5000, preferably of at least 1500 and preferably at most 4000. It is especially preferred if it contains one amino group per molecule, which has a $pK_b$ value of 2.5 to 7.0. (The $pK_b$ value is the negative common logarithm of the basic dissociation constant.) Particularly good results are achieved if it contains at least two secondary and/or primary amino groups per molecule. If the number is too low, the solubility is inadequate or the pH values in the precipitation baths become too acidic due to too high a degree of neutralization. If the amine number is too high, a poorly adhering film or a bubbly surface are formed during the precipitation.

For the cross linking process during baking, secondary and primary amino groups and/or secondary and primary hydroxyl groups are required, primary amino and/or hydroxyl groups being preferred. If the number of these groups, which are capable of cross linking, is too small, the cross linking after baking is inadequate; if their number is too high, the film becomes brittle. This is well known to those skilled in the art.

After diluting with ethylene glycol monobutyl ether to 50 weight percent at 25° C., viscosities of about 0.5 to 5.0 Pas correspond to the above-mentioned molecular weights. The suitable average molecular weight or the suitable viscosity can also be obtained by mixing resins with higher and lower viscosities or molecular weights.

As cationic synthetic resin binder, a reaction product of ketimines or aldimines is preferred which contain at least one secondary amino group, or diamines with polyglycidyl ethers containing 1,2-epoxy groups. Advisably, the polyglycidyl ethers contain at least two 1,2-epoxy groups per molecule. They can be prepared by (a) introducing glycidyl groups in alkaline medium, for example, via epichlorohydrin,
  (aa) in OH functional resins, for example, epoxy novolacks, with formation of polyglycidyl ethers,
  (ab) in COOH functional resins with formation of polyglycidyl esters, or
  (ac) in NH2 functional resins with formation of polyglycidyl amines,
(b) copolymerizing unsaturated glycidyl monomers such as glycidyl methacrylate, N-glycidyl methacrylamide or allyl glycidyl ether with different unsaturated, copolymerizable monomers such as styrene and/or methacrylates of different chain lengths and/or hydroxyalkyl methacrylates, in which the alkyl radicals of the alcohols have 1 to 12 carbon atoms (linear or branched).

Especially preferred according to (a) is the polyglycidyl ether, which contains the 1,2-epoxide groups and has the general formula

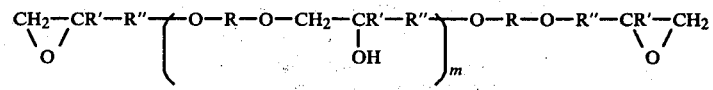

in which

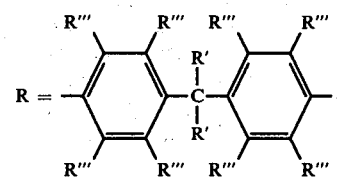

$R'$ = hydrogen or $-C_nH_{2n+1}$
$R'' = -(CR'_2)_n-$
$R''' = R'$ or halogen, preferably hydrogen
$m = 0$ to 6
$n = 1$ to 3

They have an average molecular weight ($M_n$) of about 300 to 2000 and an epoxide equivalent weight of about 170 to 1500. Such resins are reaction products of epichlorohydrin with dihydroxydiphenylmethane (bisphenol F) or dihydroxydiphenylpropane (bisphenol A). It is also possible to use the corresponding heterocyclic polyepoxy compounds, such as 1,3-diglycidyl-5,5-dimethylhydantoin, diepoxides from bisimides according to U.S. Pat. No. 3,450,711 or also 1,3,5-triglycidyl isocyanurate.

The introduction of the amino groups or the hydroxyl groups is accomplished by the equivalent reaction of epoxy groups with secondary and/or primary monoamines, dialkylaminoalkylamines, monoalkylhydroxyalkylamines, dihydroxyalkylamines or suitable ketimines or aldimines, or by the reaction with excess alkylene polyamines, such as ethylenediamine and distilling of the excess amine. Examples of compounds, which may be used, are diethylamine, dimethylaminopropylamine, N-methylaminoethanol, diethanolamine, as well as suitable ketimes or aldimines of the following formula

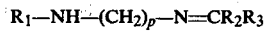

in which $R_1$ represents one of the following groups

—(CH₂)$_p$—OH
—(CH₂)$_p$—N=CR₂R₃

R₂ represents hydrogen or an alkyl group with 1 to 6 carbon atoms, R₃ an alkyl group with 1 to 6 carbon atoms, p a whole number from 1 to 8 and q a whole number from 0 to 6.

Examples of the above are the aldimine from methylaminopropylamine and isobutyraldehyde, the ketime from diethylenetriamine and methyl isobutyl ketone, or the ketimine from aminoethylethanolamine and methyl isobutyl ketone. On being dissolved in water, the ketimine or aldimine hydrolyzes and the protective group strips off forming primary amines. The definition "primary amino groups" is understood to include also the amino groups protected by ketimine or aldimine groups. In reactions with epoxy groups, primary amines are difunctional and therefore react with enlargement of the molecule. Other chain enlarging materials, which can be incorporated, are, for example, polyalcohols such as 1,6-hexanediol, bishydroxyethylsulfone, tris-(2-hydroxyethyl)-isocyanurate or dihydroxydiphenylpropane. A diamine with two secondary amino groups can be prepared from 1 molecule of diamine, such as 1,6-hexanediamine, diaminodiphenylmethane or amino group-containing hydantoins by reaction with two moles of glycidyl ether such as phenyl glycidyl ether or glycidyl ester such as the glycidyl ester of "versatic acid". With the help of these compounds, it is possible to incorporate tertiary amino groups in the center of the molecule by reaction with excess polyepoxides. As a result, the dispersibility is improved because the ammonium salts, resulting from salt formation, are distributed over the whole of the molecule and are not arranged only at the end of the molecule. Branching is incorporated in the molecule by reacting excess epoxide with diamines, which contain two primary or one primary and one secondary amino group, such as diaminodiphenylmethane or methylaminopropylamine. The molar ratio between epoxy group and amino group-containing compounds should be selected so that the complete incorporation of the amine is ensured, as otherwise rupture-like surface defects occur during the electrophoretic coating, that is, a slight excess of epoxy groups is advantageous. The reaction of the amines commences already at room temperature and generally is exothermic. It can be accelerated by the addition of catalytic amounts of weak acids (phenols or triphenylphosphine. In order to achieve complete reaction, it is generally necessary to raise the temperature for a time to about 50° to 150° C. Before addition of the amine, the resin, containing the 1,2-epoxy groups, is dissolved in anhydrous organic solvents such as xylene or methyl isobutyl ketone, which must be distilled off later before the dilution, or in solvents such as ethylene glycol, diacetone alcohol or dimethyl diethyleneglycol ether, which can remain in the solution. The reaction of polyalcohols with the epoxy groups takes place in the presence of catalysts such as dimethylbenzylamine, 1-methylimidazole, 2-ethyl-4-methyl-imidazole or the Friedel-Crafts catalysts such as borofluoride etherate at temperatures of about 100° to 150° C. In addition, hydroxyl groups may be introduced by reacting hydroxyalkylcarboxylic acids, such as hydroxyacetic acid, lactic acid or dimethylolpropionic acid with epoxy groups.

A different, well-known method for preparing resins with secondary and/or primary amino groups is the reaction with lower aliphatic linear or branched C₂ to C₆ alkylenediamines or polyalkylenediamines, for example, ethylenediamine or diethylenetriamine, which is particularly appropriate when the reaction temperature, required for the addition, esterification or transesterification, must be so high that undesirable side reactions, such as the decomposition of ketimines, take place. In order to avoid gel formation, first of all 1.1 to 8 moles of excess polyamine and preferably 2 to 6 moles of excess polyamine are used and secondly, the epoxy resin is added to the polyamine. The epoxy resin may be strewn in as a solid, powderized material or it may be added as a solution in an organic solvent such as xylene, a xylene/butanol mixture or methyl isobutyl ketone. The solvent and excess amine must then be distilled off carefully under vacuum and with exclusion of oxygen, and can then be used again for the next batch. In order to avoid uncontrolled reactions at altered equivalent ratios in the vapor space, the epoxy resin solutions should be added below the surface with very good stirring. A thin-film evaporator, steam distillation or a washing process with water is suitable for removing amine residues.

As component B for the inventive electro-dipping varnish/coating material, a wire-coating resin, compatible with component A, from the group of polyesteramides, polyesteramidimides and/or polyhydantoins, with a melting point (by the Kofler method) of more than 60° C. and preferably of more than 90° C., is used in an amount of 50 to 2000 parts by weight per 100 parts by weight of cationic synthetic resin binder (component A). The upper limit for the melting point preferably is 150° C., 120° C. being especially preferred.

The inventive coating material advisably contains, per 100 parts by weight of component A, at least 100 and preferably at least 150 parts by weight and at most 1000 and preferably at most 500 parts by weight of B. The nonionic synthetic resin binder preferably is a polyesterimide of multibasic aromatic carboxylic acids with at least two carboxyl groups in positions ortho to each other and at least one additional functional group, multifunctional amines, dihydric or multihydric alcohols and optionally other aliphatic and/or aromatic multibasic carboxylic acids. These polyesterimides are used on a large scale as binders for wire coating materials. At room temperature, they react neither with themselves or with the carrier resin. However, under the usual baking conditions, they fuse and cross link with the cationic synthetic resin binder to a compatible film. The polyesterimides advisably contain up to 5 weight percent of nitrogen, fixed in 5-member imide rings.

The cocondensed components or starting materials for the preparation of the polyesterimides may be the same as those for the polyestermide resins of the state of the art. In this connection, reference is made, for example, to the abovementioned publications. Some suitable starting products are listed below. However, suitable materials are not limited to the products mentioned.

As carboxylic acid with at least two carboxylic groups in positions ortho to each other and at least one additional functional group, trimellitic acid and/or its anhydride is preferably used. Examples of other acids, falling into this group, are pyromellitic acid, benzophenonetetracarboxylic acid and their esters or anhydrides. As a rule, the anhydrides are preferred.

Suitable multifunctional amines are diaminodiphenylmethane, diaminodiphenylpropane, diaminodiphenyl ether, diaminodiphenylsulfone, 2,5-bis-(4'-aminophenyl)-1,3,4-oxadiazole (see German Auslegeschrift 2,659,709) or amine-substituted hydantoins. As is the case of the state of the art, diaminodiphenylmethane is preferred.

As multihydric alcohols, ethylene glycol, propylene glycol, diethylene glycol, 1,3-bis-(2'-hydroxyethyl)-5,5-dimethylhydantoin (German Auslegeschrift 2,342,415) and 1,3-bis-(2'-hydroxyethyl)benzimidazolone (German Auslegeschrift No. 2,342,431) are used. As in the case of the state of the art, ethylene glycol is preferred. Examples of triols are glycerine, tris-(2-hydroxyethyl)-isocyanurate (THEIC) and N,N',N"-tris-hydroxyalkyl-triazolidine-3,5-dione (German Auslegeschrift No. 2,908,628). As in the case of the state of the art, THEIC, optionally in admixture with ethylene glycol, is expecially preferred, the proportion of THEIC preferably amounting to 20 to 60 equivalent percent of the total amount of the multihydric alcohols.

The above-defined, other, aliphatic and/or aromatic multibasic carboxylic acids are, for example, terephthalic acid, isophthalic acid, p-tert-butylisophthalic acid, adipic acid, 1,2,3,4-butanetetracarboxylic acid and 2-aminoterephthalic acid or optionally their esters with lower aliphatic monoalcohols, especially methanol or ethanol, or anhydrides. As in the case of the state of the art, dimethyl terephthalate is preferred. However, mixtures of the respective starting compounds can also be used.

As in the state of the art, the polycondensation of the polyesterimides and polyesteramidmides is accomplished in the melt by heating the starting components for several hours to temperatures of about 140° to 210° C. The usual esterification catalysts are advisably added: Metal salts such as zinc-II, manganese-II- or cerium-III-acetate, tin-II-oxalate, metal oxides such as antimony trioxide, dibutyl tin oxide, litharge, metal complexes such as alkyl titanates or metal amine complex catalysts according to the German Auslegeschrift No. 1,519,372. As in the state of the art, zinc acetate and butyl titanate are preferred. The amounts of raw materials are so calculated that the equivalence ratio of the hydroxyl groups to the carboxyl groups (or the potential carboxyl groups, esterified or present as anhydrides) advisably lies between 1.4 and 2.5. The lower limit preferably lies at about 1.8 and the upper limit preferably at 2.4. The synthesis can be accomplished stepwise, that is, a diimide dicarboxylic acid is prepared from the multibasic carboxylic acid, for example, trimellitic acid, and the amine. The diimide carboxylic acid, after isolation and purification or directly form the reaction solution, can be polycondensed with the additional starting component to the polyesterimide resin. As is well known, polyesteramidimides are obtained if an excess of amine is used. As carboxyl groups, which are used for calculating the equivalence ratio to the hydroxyl and optionally to the amino groups according to the above definition, only those (optionally esterified, i.e. potential) carboxyl groups are included which are available for an esterification reaction with multihydric alcohols or an amide formation with amines. The synthesis of the (amide)-imide-modified ester resins is accomplished by esterifying the multibasic carboxylic acids mentioned with multihydric alcohols. In so doing, it is however also possible to carry out the synthesis of the heterocyclic carboxylic acids which are to be preformed, for example, diimide dicarboxylic acids, and the esterification of these diimide dicarboxylic acids with the multihydric alcohols in one step in one vessel, because the amino groups react preferably with the ortho carboxyl groups or their anhydride groups, for example, of trimellitic acid or its anhydride, forming 5-membered imide rings and because therefore only those carboxyl groups of the originally used carboxylic acids or their anhydrides remain available for the esterification with the alcohols, which did not react with amino groups to form 5-membered imide rings. Therefore, as multifunctional compounds for the formation of polyesters, also those compounds, contaning multifunctional carboxylic acids, alcohols or amino groups are understood to be included, which contain 5-membered imide rings and which can be formed during the reaction of the starting components. In calculating the equivalence ratio therefore, such a diimide carboxylic acid is a polycarboxylic acid, which has true carboxyl groups which must be taken into consideration in the calculation of the equivalence ratio.

If the component B content is too low, the electrical and thermal properties of the coated wires become worse; if the component B content is too high, the stability of the aqueous dispersion is jeopardized. The aim is to achieve as high a content of insoluble wire-coating resin as possible. The ability of the carrier resin (cationic synthetic resin binder) to take up water-insoluble wire-coating resin generally increases with an increasing amine number. The ratio of carrier resin to wire-coating resin determines the ability to deposit during the electro-dipping process, that is, the film thickness, which can be deposited, increases as the content of wire-coating resin increases. In order to harmonize the optimum properties, the various types of carrier resin and/or the different wire-coating resins can be used alone or as a mixture of several resins.

In order to improve the process and increase the cross-linking density, up to 30 weight percent of Component B can be replaced by different, compatible, additional resins, such as hydroxyl group-containing polyesters, polyesteramides, blocked isocyanates and/or also saturated or unsaturated hydrocarbon resins, preferably in an amount of at most 20, especially of at most 15 and at least 2 weight percent. As hydroxyl group-containing polyesters or polyesteramides, polycondensates, with at least two hydroxyl groups per molecule, especially of aromatic polycarboxylic acids, preferably benzene carboxylic acids with two to four carboxyl groups, such as isophthalic acid, terephthalic acid (dimethyl ester) or trimellitic acid (anhydride), and polyalcohols and/or polyamines, as described above, are used. Carboxyl group—containing polyesters or copolymers, whose carboxyl groups are blocked by optionally substituted 1,2-glycols with formation of β-hydroxy compounds, are preferred:

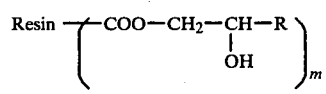

in which R represents —CH$_2$—O—R',

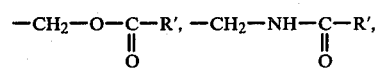

—R', or —H,
R'=—$C_nH_{2n+1}$, —$C_mH_{2m+1}$, —$C_6H_5$
n=1-20, preferably 2-15
m=2-10, preferably 3-7.

The 1,2-glycols used may be substituted with saturated or unsaturated alkyl, ether or amide groups. Examples of such OH polyesters are polyethyleneglycol terephthalate or a polycondensate according to the European Auslegeschrift No. 12,463 from trimellitic anhydride and the glycidyl ester of "versatic" acid with hydroxyl numbers up to 400.

As blocked isocyanates, polyisocyanates with at least two isocyanate groups per molecule are used, whose isocyanate groups are reacted with monofunctional compounds having an active hydrogen. The resins obtained should be stable in the aqueous phase and emulsifiable in the carrier resin. After the protective group is split off, the resins, under the action of heat react with the reactive hydroxyl and/or amino groups still present in the resin mixture. Suitable as blocked polyisocyanates are the products described in the German Auslegeschrift No. 3,002,865, for example, the reaction products of toluylene diisocyanate and 2-ethylhexanol, of toluylene diisocyanate and dimethylethanolamine, of toluylene diisocyanate, trimethylolpropane and cresol, of isophorone diisocyanate and caprolactam or of a biuret-containing trihexamethyl isocyanate and caprolactam.

As hydrophobic, polymeric substance without functional groups, which favor the spreading of the coating material, ketone resins or hydrocarbon resins such as dicyclopentadiene resins, coumarone or coumarone-indene resins may be used. The coating may contain the usual varnish additives, such as catalysts, spreading agents, defoamers, colored resins, etc. Obviously, only such additives should be selected, which do not enter into any interfering reactions with water at an acid to a neutral pH, which do not introduce interfering, extraneous ions, especially not low molecular cations, and which do not precipitate on prolonged standing in a form which cannot be redispersed by stirring, that is, even after prolonged standing, it must be possible to transform the coating material into a dispersion by stirring and the like.

The cationic synthetic-resin binder is made water-soluble in a known manner by protonizing with acids. Examples of acids are hydrochloric acid, formic acid, acetic acid, lactic acid, citric acid, malonic acid, acrylic acid, gluconic acid, phosphoric acid or alkylphosphoric acid. At least enough acid must be added so that the cationic synthetic-resin binder dissolves. An excess of acid, that is, a degree of neutralization above 100%, advisably to be avoided. Formic, acetic acid and lactic acid are preferred.

In order to control the deposition voltage and to improve the adhesion and the process, the coating material may contain up to approximately 20 weight percent of organic solvent in order to lower the viscosity. Every effort is made to keep the organic solvent content low, especially below 15 weight percent and particularly below 10 weight percent. Alcohols, glycol ethers, ketol alcohols, ketones, dimethylformamide, dimethylsulfoxide, dimethylacetamide, N-methylpyrrolidone, monophenyl ether of ethylene glycol or propylene glycol, 1,1-dioxathiolan, ethylene glycol, propylene glycol, cyclohexanone or aliphatic and aromatic hydrocarbons of different chain lengths may be used as solvent. In making the selection, it must be taken into consideration that the wire-coating resins are not dissolved in the dispersion and that portions of water-insoluble solvents can facilitate the dispersing process and stabilize the dispersion. As the solvent content increases, the wires are not enveloped as well and excessive film thicknesses may result; with a decreasing solvent content, the thickness of the film deposited decreases. After dilution with water, the solids content of the varnish, in which the inventive coating material is contained, is advisably 5 to 30 weight percent and preferably 10 to 20 weight percent. The pH of the varnish generally is between 4.0 and 7.5 and preferably between 5.0 and 7.0. If the pH is too high, dispersing difficulties occur and the resin precipitates; if it is too low, the metallic parts of the equipment corrode (vapor-phase corrosion).

The electrophoretic precipitation advisably takes place no earlier than 24 hours after the preparation of the bath. During this time, the bath is advisably stirred continuously, in order to achieve a uniform distribution. As anode, electrically conducting, noncorroding electrodes of, for example, rustproof steel or graphite are used. As is well known for electrophoretic deposition processes, the object, which is to be coated and which is to form the cathode, and the anode are in aqueous bath. All metallic, conducting workpieces can be coated, e.g. copper, aluminum, tin, zinc, iron and alloys of these metals. The preferred process for coating electrical conductors with the inventive, electro-dipping varnish/coating material in the electro-dipping process is one in which the electrical conductor, which is to be coated, is connected in the circuit as a cathode. The invention also relates to the use of the above-defined electro-dipping varnish/coating material of electrical conductors, especially copper wire, which are connected in the circuit as a cathode, by applying a voltage in the electro-dipping process and subsequently baking.

During the deposition, the bath is advisably maintained at temperatures of 15° to 35° C. The solids content, deposition temperature and time, as well as voltage are so selected that the desired film thickness is obtained after rinsing off and baking.

On applying an electrical current with a voltage of advisably 50 to 400 volt between the metallic, conducting workpiece and a counter electrode, the water-soluble carrier resin coagulates at the cathode. In so doing, it carries along the water-insoluble wire-coating resin. The coating time in the wire coating machine is 0.5 seconds to 3 minutes, especially 2 to 30 seconds. With this, the ratio of carrier resin to wire-coating resin in the deposited film is displaced and moreover in favor of the wire-coating resin. At the same time, the concentration of water and of the acid, used for the neutralization, are increased in the bath. For refilling the bath therefore, concentrated varnishes must be used, if necessary with a lesser degree of neutralization, which compensate for these displacements by altering the quantity ratios. This correction can also be achieved with suitable equipment, for example, with ultrafiltration or electrodialysis processes.

Curing is normally accomplished by baking for 15 minutes to 1 hour at object temperatures of about 160° to 200° C. With shorter residence times in the wire-coating machine, it is necessary to increase the baking temperature. Values, based on practical experience, are 1 to 3 minutes at furnace temperatures of 300° to 600° C. By working in, for example, 0.5 to 5 weight percent of transesterification catalysts, the baking temperature can be lowered or the completion of the reaction can be accelerated. In addition to the catalysts already mentioned above, ammonium compounds such as benzyl trimethylammonium hydroxide, organic tin compounds such as dibutyl tin dilaurate, titanium complexes such as triethanolamine titanate, lead octoate or cobalt naphthenate, cyclopentadiene thallium, as well as acetylacetonates of zinc, iron, chromium or lead can be used.

Cationic Synthetic Resin Binder A 1

Ethylene glycol monobutyl ether (448 g) is heated to 120° C. in a 3-neck flask equipped with stirrer, dropping funnel and reflux condenser. Subsequently, 1056 g of a polyglycidyl ether, based on bisphenol A and having an epoxide equivalent weight of 482 (Epikote 1001 ®) is scattered in portionwise and stirred until it is all dissolved. After cooling the mixture to 60° C., 76.6 g of diethanolamine are added and the temperature is prevented from rising above 62° C. by cooling. It is maintained at 60°±2° C. until the combined epoxy and amine values (milliequivalents per gram of solution) lie between 1.38 and 1.40. Subsequently, a mixture of 37.2 g of dimethylaminopropylamine, 232 g of a preproduct of one mole of 1,6-hexanediamine and 2 moles of the glycidyl ester of "versatic" acid (Cardura E ®) and 149 g of ethylene glycol monobutyl ether are added rapidly, the temperature rising to about 90° C. In order to complete the reaction, the temperature is subsequently maintained for one hour at 90° C. and then for one hour at 120° C.

| | |
|---|---|
| Solids Content: | 69.9 weight percent (baking for 40 minutes at 180° C.) |
| Viscosity: | 3 Pas (after diluting to 50 weight percent with ethylene glycol monobutyl ether at 25° C.) |
| Amine Number: | 84 mg KOH/g of solid resin |
| Hydroxyl Number: | 287 mg KOH/g of solid resin |

Cationic Synthetic Resin Binder A 2:
Preproduct:

A polyglycidyl ether (309 g) based on bisphenol A and having an epoxy equivalent weight of 486 (Epikote 1001 ®) is carefully molten under an inert gas in a reaction vessel. While stirring, 1085 g of a polyglycidyl ether, based on bisphenol A and having an epoxy equivalent weight of 607 (Epikote 1002 ®), is scattered in so that it is all dissolved. After the addition of 0.3 g of triphenylphosphine and 105.7 g of "versatic" acid, the mixture is heated for one to two hours to 150° to 160° C. and maintained at this temperature, until the acid number is less than 1 mg KOH/g of solids. The resin is cooled and broken up into small pieces.

Epoxy Equivalent Weight: 855
Amine Resin:

Technical grade xylene (424 g) and 262 g of ethylenediamine are weighed into a reaction vessel, which is equipped with stirrer and reflux condenser, blanketed with an inert gas and heated to 80° C. While stirring rapidly, the preproduct is then scattered in portionwise over a period of about 4 hours. The mixture is subsequently maintained for two hours at 100° C. After heating to 160° C., the excess ethylenediamine and the xylene are distilled off, at the end under vacuum. The removal of the residual amine is accomplished by steam distillation. The resin obtained was diluted with ethylene glycol monobutyl ether to 80 weight percent.

| | |
|---|---|
| Solids Content: | 77.4 weight percent (after heating for 40 minutes to 180°) |
| Viscosity: | 1.55 Pas (after diluting to 50 weight percent with ethylene glycol monobutyl ether at 25° C.) |
| Amine Number: | 104 mg KOH/g of solid resin |
| Hydroxyl Number: | 220 mg KOH/g of solid resin |

Cationic Synthetic Resin Binder A 3:

A polyglycidyl ether (1605 g), based on bisphenol A and having an epoxy equivalent weight of 243 (Epikote 834 ®), is dissolved in 660 g of ethylene glycol monoethyl ether and 90 g of ethylhexanol with careful stirring and heating to about 60° C. After cooling to 50° C., 224 g of diethanolamine are added and the exothermic reaction is kept at a temperature of about 60° C. by cooling, until the combined epoxy and amine values are approximately 2.1 milliequivalents per gram of solution. Subsequently, 422 g of diaminodiphenylmethane are added and the temperature is maintained initially for one hour at 80° C. and then, after further heating, for one hour at 120° C.

| | |
|---|---|
| Solids Content: | 79.5 weight percent (after 40 minutes baking at 150° C. with addition of 1 mL of technical grade xylene) |
| Viscosity: | 2.2 Pas (after diluting to 50 weight percent with ethylene glycol monoethyl ether at 25° C.) |
| Amine Number: | 125 mg KOH/g of solid resin |

Cationic Synthetic Resin Binder A 4:

A polyglycidyl ether (1446 g), based on bisphenol A and having an epoxy equivalent weight of 243, is dissolved in 660 g of ethylene glycol monomethyl ether and 90 g of 2-ethylhexanol with careful stirring and heating to 60° C. After the addition of 363 g of bisphenol A, heating is continued for two hours under reflux (about 150° C.), during which time the epoxy equivalent weight rose to 758. After cooling to 45° C., 441 g of an 80% solution of methylaminopropylamine/methyl isobutyl ketimine in methyl isobutyl ketone were added gradually. Subsequently, the temperature was maintained for one hour at 80° C. and then for one hour at 120° C., during which time 59 g of methyl isobutyl ketone were distilled off under vacuum.

| | |
|---|---|
| Solids Content: | 73.7 weight percent (after 40 minutes baking at 150° C. with addition of 1 mL of technical grade xylene) |
| Viscosity: | 3.6 Pas (after diluting to 50 weight percent with ethylene glycol monomethyl ether at 25° C.) |
| Amine Number: | 78 mg KOH/g of solid resin |

Cationic Synthetic Resin Binder A 5

A polyglycidyl ether (1632 g), based on bisphenol A and having an epoxy equivalent weight of 243 (Epikote 834 ®) was dissolved in 660 g of ethylene glycol monomethyl ether and 90 g of 2-ethylhexanol with careful stirring and heating to 80° C. After the addition of 321 g of bisphenol A, the mixture was heated for 1.5 hours under reflux (about 146° C.), during which time the epoxy equivalent weight rose to 720. After cooling to 50° C., 297 g of dimethylaminopropylamine were added. Subsequently, the temperature was maintained for one hour at 80° C. and, after further heating, for one hour at 120° C.

| Solids Content: | 80.6 weight percent (after 40 minutes baking at 150° C. with the addition of 1 mL of technical grade xylene) |
|---|---|
| Viscosity: | 1.1 Pas (after diluting to 50 weight percent with ethylene glycol monoethyl ether at 25° C.) |
| Amine Number: | 131 mg KOH/g of solid resin |

Nonionic Synthetic Resin Binder B-1 (Polyesterimide)

Ethylene glycol (166.4 g, 2.684 moles), 51 g (0.67 moles) of propylene glycol, 493 g (1.89 moles) of tris-(2-hydroxyethyl)isocyanurate, 303 g (1.56 moles) of dimethyl terephthalate were added to a 3-neck flask, equipped with stirrer, thermometer and fractionating column. After the addition of 1 g of zinc acetate, the temperature was raised in an atmosphere of nitrogen. At about 140° to 150° C., the distillation of methanol, released by transesterification, commences. After about 3 hours, 100 g of methanol have distilled over; the temperature is 210° C. After cooling to about 170° C., 216.8 g (1.13 moles) of trimellitic anhydride and 111.8 g (0.565 moles) of diaminodiphenylmethane are added and cocendensed by heating to 200° to 210° C., until about 41 g of water have been distilled off.

After cooling to 170° C., a fresh lot of 216.8 g (1.13 moles) of trimellitic anhydride and 111.8 g (0.565 moles) diaminodiphenylmethane are added and cocendensed by heating to 200° to 210° C., until about 41 g of water have been distilled off. After cooling once again to about 170° C., a further 216.8 g (1.13 moles) of trimellitic anhydride and 111.8 g (0.565 moles) of diaminodiphenylmethane are added and cocondensed at 200° to 210° C. until a further 41 g of water have been distilled off and the acid number has dropped below 10. At 150° C., 60 g of titanium acetylacetonate are stirred in as catalyst. After cooling, the polyesterimide resin has a melting point range (Kofler heated stage) of 95° to 110° C. Viscosity; 1120 mPas (after diluting 1 part of solid resin with two parts of m-cresol at 25° C.). For the Examples 2 to 6, the polyesterimide resin is dissolved in dimethylformamide to give a 70 weight percent solution.

Nonionic Synthetic Resin Binder B 2 (Polyesteramidimide)

Ethylene glycol (495 g, 7.98 moles), 1466 g (5.62 moles) of tris-(2-hydroxyethyl)-isocyanurate, 582 g (3.0 moles) of dimethyl terephthalate are added to a 3-neck flask, equipped with stirrer, thermometer and fractionating column. After the addition of 30 g of zinc acetate, heating is commenced in an atmosphere of nitrogen. At about 140° to about 150° C., the distillation of the methanol, released by the transesterification, commences. After about 3 hours, 192 g of methanol have distilled off. After cooling to 140° C., 427 g (2.57 moles) of isophthalic acid are added and cocondensed by heating to 200° to 210° C., until about 92 g of water have distilled off. After cooling to about 170° C., 576 g (3.0 moles) of trimellitic anhydride and 317 g (1.6 moles) of diaminodiphenylmethane are added and cocondensed by heating to 200° to 210° C., until about 54 g of water have distilled off. After cooling once more to about 170° C., a further 576 g (3.0 moles) of trimellitic anhydride and 317 g (1.6 moles) diaminodiphenylmethane are added and cocondensed at 200° to 210° C. until a further 54 g of water have been distilled off and the acid number has fallen below 12. At 150° C., 60 g of titanium acetylacetonate are stirred in as catalyst. Viscosity: 940 mPas (after diluting 1 part solid resin with 2 parts of m-cresol at 25° C.). After cooling, the polyesteramidimide resin has a melting point range (Kofler hot stage) of 85° to 105° C.

Additive Resin C 1 (Polyester)

In accordance with the European Auslegeschrift 12,463, page 17, Example II a, 781 g of trimellitic anhydride are dissolved at 100° C. in 1975 g of ethylene glycol monobutyl ether and mixed with 2236 g of a glycidyl ester of the "versatic" acid (Cardura E-10 ®), as well as 7 g of benzyldimethylamine. This mixture is heated with stirring to 120° C. and kept at this temperature until the acid number has dropped below 1.1 mg KOH/g. The polyester has the following characteristic data:

| Solids Content: | 70.7 weight percent (after baking for 60 minutes at 125° C.) |
|---|---|
| Acid Number: | 0.7 mg KOH/g of solid resin |
| Epoxy Equivalent Weight: | 10,000 |

Addition Resin C 2 (Blocked Isocyanate)

To 174 g of toluylene diisocyanate, a mixture of 260 g of anhydrous 2-ethylhexanol and 2 drops of dibutyl tin dilaurate are added with stirring and external cooling at such a rate, that the temperature of the reaction mixture remains below 50° C. After stirring for 3 hours, the NCO content was zero.

EXAMPLE 1

Carrier resin A 1 (214.3 g) was neutralized with 11.7 g of an 80 weight percent solution of lactic acid in water and gradually diluted with deionized water to a stirable paste. Then 300 g of polyesterimide resin B 1 were added as a powder and the mixture was carefully dispersed in a ball mill. After filtering off the glass beads, the dispersion was diluted with deionized water to a solids content of 22 weight percent. (The solids content was determined by heating for 25 minutes at 180° C.). The pH of the bath was adjusted to 5.0.

A copper wire of diameter 1.0 mm was drawn through a bath containing the above-described coating material, the copper wire being connected in the circuit as a cathode. A sheet of nonrusting steel was used as anode. The rate of discharging the copper wire was so adjusted, that depositing took place during 2 minutes. The temperature of the bath was 25° C. and the bath was agitated vigorously by stirring, in order to ensure a uniform distribution of the components. The voltage applied was 240 v. On leaving the bath, the wire was rinsed with water, initially preheated for 5 minutes to an object temperature of 100° C. in order to dry it and then heated for 30 minutes to an object temperature of 200° C. in order to bake the film. A smooth coating, 45 μm thick, was obtained.

EXAMPLE 2

Carrier resin A 1 (1914 g), 5487 g of polyesterimide resin solution (70 weight percent) B 1 and 633 g of polyester C 1 were molten at about 80° C. and neutralized with 296 g of 80% lactic acid (dissolved in water). The dispersion was produced by slowly adding 16.6 kg of deionized water while stirring with the dissolver.

90% of the precipitated particles had a particle size of less than 15 μm.

Solids Content: 21.9 weight percent (after heating for 30 minutes at 180° C.).

The wire was coated on a wire-coating machine under the following conditions:

| | |
|---|---|
| Coating speed: | 8 m/min. |
| Voltage: | 20 volt |
| Deposition time: | 5.6 seconds |
| Bath Temperature: | 25° C. |
| Baking temperature: | 450° C. |
| Baking time: | 6 minutes |
| Coating increase: | 45 to 50 μm |
| Copper wire diameter: | 1 mm |

EXAMPLE 3

Carrier resin A 3 (153 g), 476 g of polyesterimide resin solution (70 weight percent) B 1 and 56 of polyester C 1 were molten at about 80° C. and neutralized with 17 g of 80% lactic acid. The coating dispersion is prepared with the dissolver by carefully adding 1.3 kg of deionized water.

Solids Content: 22.6 weight percent (after baking for 30 minutes at 180° C.).

EXAMPLE 4

Carrier resin A 4 (167 g), 476 g of polyesterimide resin solution B 1 (70 weight percent) and 56 g of polyester C 1 were molten at about 80° C. and neutralized with 15 g of 80% lactic acid. The coating dispersion was prepared with the dissolver by the gradual addition of 1.28 kg of deionized water.

Solids Content: 22.6 weight percent (after baking for 30 minutes at 180° C.).

EXAMPLE 5

Carrier resin A 5 (206.8 g), 476 g of polyesterimide resin solution B 1 (70 weight percent) and 25.0 g of blocked isocyanate C 2 were carefully molten at about 80° C. and neutralized with 19.4 g of 80% lactic acid. The coating dispersion was slowly prepared with the dissolver by the gradual addition of 4.5 kg of deionized water and 15.8 g of diethylene glycol monobutyl ether.

Solids Content: 10.0 weight percent (after baking for 30 minutes at 180° C.).

EXAMPLE 6

Carrier resin A 2 (208 g), 476 g of polyesterimide resin solution B 1 (70 weight percent) and 25.0 g of blocked isocyanate C 2 were carefully fused at about 80° C. and neutralized with 19.4 g of 80% lactic acid. The coating dispersion was prepared slowly with the dissolver by the gradual addition of 4.5 kg of water and 15.8 g of diethylene glycol monobutyl ether.

Solids Content: 10.0 weight percent (after baking for 30 minutes at 180° C.).

EXAMPLE 7

The procedure of Example 4 is followed, the polyesterimide resin solution being replaced by 476 g of polyesteramidimide resin solution B 2 (70 weight percent) and 14 g of lactic acid solution being used for the neutralization.

Solids Content: 15 weight percent (after baking for 30 minutes at 180° C.).

The data for the deposition according to Examples 3 to 7 are summarized in Table 1.

TABLE 1

| | Beispiel 3 | Beispiel 4 | Beispiel 5 | Beispiel 6 | Beispiel 7 |
|---|---|---|---|---|---|
| Badfestkorper (%) | 22.6 | 22.6 | 10.0 | 10.0 | 15 |
| pH-Wert | 3.5 | 4.7 | 4.6 | 3.8 | 5.1 |
| Badleitfahigkeit ($\mu Scm^{-1}$) | 719 | 660 | 723 | 665 | 630 |
| Abscheidespannung (V) | 150 | 150 | 150 | 150 | 200 |
| Abscheidezeit (Min.) | 2 | 2 | 1 | 2 | 0.5 |
| Badtemperatur (°C.) | 25 | 25 | 35 | 35 | 25 |
| Einbrenntemperatur (°C.) | 180 | 180 | 180 | 180 | 180 |
| Einbrennzeit (Min.) | 30 | 30 | 30 | 30 | 30 |
| Schichtdicke (μm) | 45 | 52 | 52 | 42 | 55 |
| MEQ-Wert | 92.0 | 81.0 | 90.0 | 90.0 | 75 |

Key for Table 1
Beispiel = Example
Badfestkorper = Solids content of bath
pH-Wert = pH value
Badleitfahigkeit = Bath conductivity
Abscheidespannung = Deposition voltage
Abscheidezeit = Deposition time
Einbrenntemperature = Baking temperature
Einbrennzeit = Baking time
Badtemperatur = Bath temperature
Schichtdicke = Film thickness
MEQ-Wert = Milliequivalent value

We claim:

1. Aqueous electro-dipping varnish/coating material, which can be deposited at the cathode and which contains a cationic synthetic resin binder, that can be made water-soluble by protonizing with acids, and a nonionic synthetic resin binder, characterized by the fact that it contains (A) as cationic synthetic resin binder, an amino group-containing carrier resin with an amine number of 50 to 200 and a hydroxyl number of 50 to 400, (B) as nonionic synthetic resin binder, a water-insoluble wire-coating resin from the group of polyesterimides, polyesteramidimides and polyhydantoins with a melting point above 60° C. in an amount of 50 to 2,000 parts by weight per 100 parts by weight of Component A, and (C) transesterification catalysts, which are essentially stable in water, in an amount of 0.1 to 5 parts by weight per 100 parts of the sum of Components A and B.

2. Electro-dipping varnish/coating material according to claim 1, characterized by the fact that it contains at least 100 and preferably 150 parts by weight of Component B per 100 parts by weight of Component A.

3. Electro-dipping varnish/coating material according to claim 1, characterized by the fact that it contains at most 1,000 and preferably at most 500 parts by weight of Component B per 100 parts by weight of Component A.

4. Electro-dipping varnish/coating material according to claim 1, characterized by the fact that Component A has an amine number of 80 to 150 and a hydroxyl number of 100 to 300.

5. Electro-dipping varnish/coating material according to claim 1, characterized by the fact that the cationic synthetic resin binder contains at least two secondary and/or primary amino groups per molecule.

6. Electro-dipping varnish/coating material according to claim 5, characterized by the fact that the cationic synthetic resin binder is a reaction product of ketimines or aldimines, which additionally contain at least one secondary amino group, or of diamines with polyglycidyl ethers containing 1,2-epoxy groups.

7. Electro-dipping varnish/coating material according to claim 1, characterized by the fact the nonionic synthetic resin binder (Component B) is a polyesterimide or a polyesteramidimide of multibasic aromatic carboxylic acids, having at least 2 carboxyl groups in positions ortho to each other and having at least one additional functional group, of multifunctional amines, of dihydric and multihydric alcohols and optionally of other aliphatic and/or aromatic multibasic carboxylic acids.

8. Electro dipping varnish/coating material according to claim 7, characterized by the fact that the multibasic aromatic aromatic carboxylic acid, having at least 2 carboxyl groups in positions ortho to each other and at least one additional functional group, is trimellitic acid or its anhydride.

9. Electro-dipping varnish/coating material according to claim 7 or 8, characterized by the fact that the multifunctional amine is diaminodiphenylmethane.

10. Electro-dipping varnish/coating material according to claim 1, characterized by the fact that the dihydric and multihydric alcohols are a mixture of ethylene glycol and optionally propylene glycol as well as THEIC, the proportion of THEIC preferably amounting to 20 to 60 equivalent percent of the total amount of the multihydric alcohols.

11. Electro-dipping varnish/coating material according to claim 1, characterized by the fact that the aliphatic and/or aromatic multibasic carboxylic acids are adipic acid and/or terephthalic acid and their methyl esters.

12. Coating process comprising (a) coating electrical conductors with the electro-dipping varnish/coating material according to claim 1, (b) said conductors being connected in circuit as the cathode, (c) applying a voltage in the electro-dipping process, and (d) subsequently baking.

13. Process for varnishing electrical conductors, especially copper wire, by coating with a heat-curable varnish coating material and heating to object temperatures of more than 160° C. and preferably of more than 200° C., characterized by the fact that the coating is carried out with an electro-dipping varnish/coating material conforming to claim 1 by an electro-dipping process, the electrical conductor, which is to be coated, being connected in the circuit as the cathode.

* * * * *